April 21, 1942.  J. E. ANDERSON  2,280,770
AUTOMATIC ARC WELDING MACHINE
Filed Aug. 29, 1940
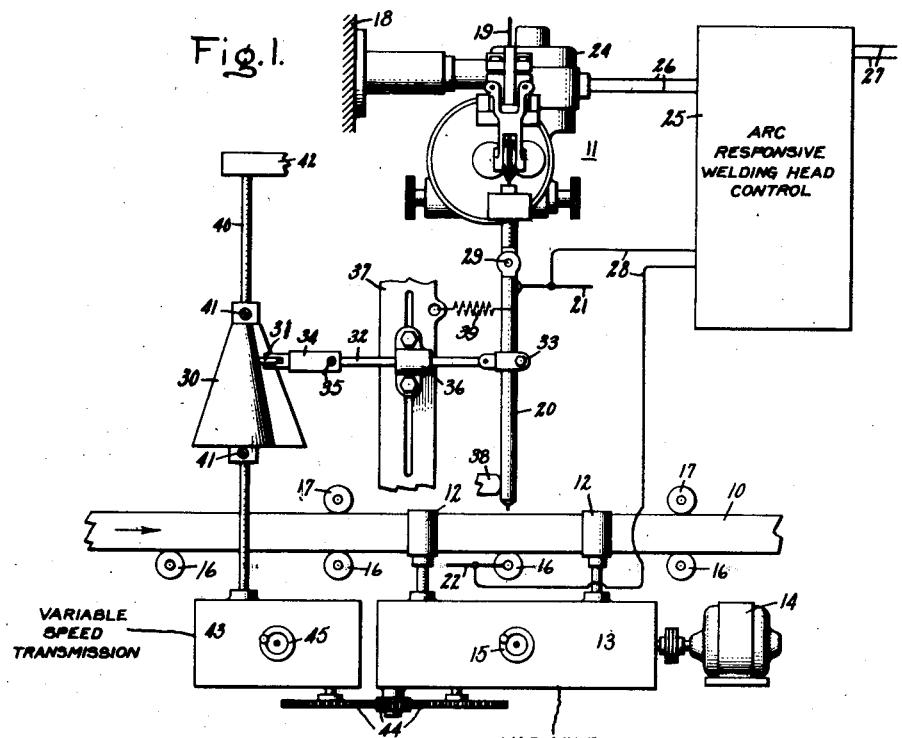
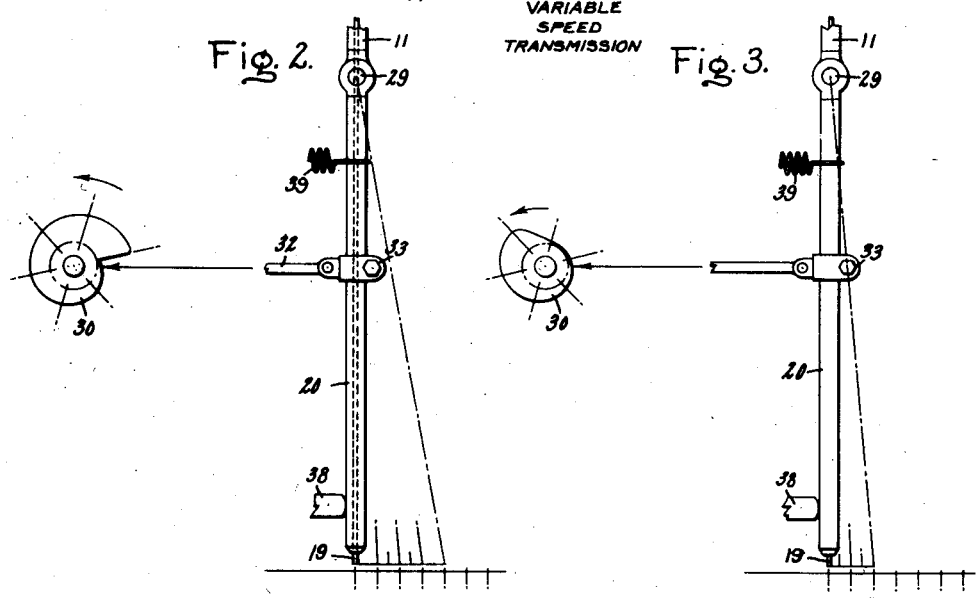
Inventor:
Jasper E. Anderson,
by Harry E. Dunham
His Attorney.

Patented Apr. 21, 1942

2,280,770

UNITED STATES PATENT OFFICE 2,280,770

AUTOMATIC ARC WELDING MACHINE

Jasper E. Anderson, Saugus, Mass., assignor to General Electric Company, a corporation of New York Application August 29, 1940, Serial No. 354,689

12 Claims. (Cl. 219—8)

My invention relates to machines for automatically performing skip welding operations.

In skip welding the parts are joined by a series of welds of predetermined length and spacing. The individual welds are frequently referred to as tack welds.

Certain assemblies may be made with intermittent tack welds and still have the strength required for their intended purpose. By using intermittent tack welds in place of a continuous weld, the speed of fabricating such assemblies may be greatly increased.

Machines for automatically making intermittent tack welds have been proposed. They have, however, very definite speed limitations because of the use of change speed clutches as well as switching means for making and breaking the welding circuit at the beginning and end of each weld. Such machines are also expensive to operate because of the excessive wear and maintenance of the change speed mechanism and switching means forming an essential part of their structure.

It is an object of my invention to provide an automatic skip welding machine which is not subject to these deficiencies.

It is a further object of my invention to provide an automatic arc welding machine in which means are provided for traversing the electrode and the work relatively to one another along the line of welding at a substantially constant speed greater than the desired speed of welding and in which means are also provided for moving the electrode relatively to said traversing means forward and backward along the line of welding at speeds which establish repeated cycles of operation during each of which, for a predetermined period of time the arcing terminal of the electrode travels over the work at the desired speed of welding to form a weld of predetermined length, and for a predetermined alternate period of time the arcing terminal of the electrode travels over the work at a speed greater than the speed of said traversing means to transfer the arc from the end of one weld to the beginning of the next weld and thus space the welds.

It is also an object of my invention to provide an automatic arc welding machine such as above described in which for predetermined periods of time no relative travel occurs between the arcing terminal of the electrode and the work at the beginning or end or at both the beginning and end of each weld or at a predetermined point in each weld.

Further objects of my invention will become apparent from the following description of one embodiment thereof.

Fig. 1 of the drawing is a diagrammatic representation of an automatic arc welding machine embodying my invention and Figs. 2 and 3 are diagrams of two cam mechanisms which are suitable for moving the arcing terminal of an electrode forward and backwards along the line of welding relatively to its traversing means for attaining welds of predetermined length and spacing. The cam of Fig. 2 is so shaped that it produces the dwell periods at the beginning and end of each weld above referred to. This cam is also shown in Fig. 1.

In accordance with my invention, change speed mechanisms and switching devices are eliminated by oscillating the arcing terminal of an electrode along the line of welding and traversing the work relative thereto at speeds greater than the permissible welding speed. The oscillation of the electrode imparts to its arcing terminal a velocity in one direction which reduces its speed relative to the work to the desired welding speed for a predetermined length of time, and a velocity in the opposite direction which increases its speed relative to the work and transfers it from the end of one weld to the beginning of another. Such an operation results in the formation of a series of welds of predetermined length and spacing at very high rates of speed.

In the automatic arc welding machine diagrammatically represented in Fig. 1 of the drawing, the work 10 is traversed relatively to a welding head 11 by pairs of travel rolls 12 which engage opposite sides thereof. These travel rolls are driven at a desired speed of rotation by a variable speed transmission 13 which in turn is driven by a travel motor 14. This variable speed transmission is provided with a hand wheel 15 for adjusting the speed of rolls 12 relative to the speed of travel motor 14.

The work may be a pipe or assembly of parts having a joint to be united by a series of welds of predetermined length and spacing. For example, the work 10 illustrated in the drawing may comprise two channel members assembled to form a box beam by placing the edges of their flanges against one another. Travel rolls 12 located on opposite sides of such an assembly hold it together with the abutting edges of the channel members in contact with each other. Means may be provided for exerting a desired pressure between each pair of travel rolls 12 in order not only to provide the desired frictional engagement between them and the work, but also to hold the work against the warping stresses that result from the welding operation. As shown in Fig. 1, the work is supported on conveyor rolls 16 against which it is held by cooperating rolls 17.

Welding head 11 is mounted on a support 18. It may be of any suitable type and is indicated as having the construction disclosed and claimed in my United States Letters Patent 2,170,673, granted August 22, 1939, and assigned to the assignee of this invention.

Electrode 19 is fed by this welding head through an electrode guide or nozzle 20 which positions its arcing terminal over the seam or line of welding in the work. Welding current is supplied to electrode 19 through nozzle 20 which is electrically connected by a conductor 21 to one terminal of a source of welding current. The other terminal 22 of this source of welding current is connected to one of the rolls 16 which in the arrangement illustrated engages the work at a point opposite the arcing terminal of electrode 19.

The speed and direction of rotation of the feed motor 24 of welding head 11 may be controlled by any suitable arc responsive welding head control 25 to feed electrode 19 toward and away from the work to strike and maintain a welding arc of predetermined length and voltage. It is connected by conductors 26 through this control to a source of supply 27. Conductors 28 also extend from the control to nozzle 20 and roll 16 to which welding current terminal 22 is connected in order to obtain a connection that is responsive to the length and voltage of the welding arc. The welding head control is preferably of a high speed type. It may, for example, be that disclosed and claimed in my United States Letters Patent 2,175,009, granted October 3, 1939, and assigned to the assignee of this invention.

Nozzle 20 is pivotally attached at 29 to the welding head. It is oscillated about this pivotal connection forward and backward along the line of welding by a three dimensional cam 30. This cam is illustrated as being conical and may have the cross-sectional configuration shown in Fig. 2. A cam follower 31 which engages this cam acts through a rod 32 to transmit its motion to the nozzle. One end of this rod is pivotally connected to a clamp 33 which is adjustable lengthwise of the nozzle. The other end of this rod is provided with a socket member 34 which constitutes a support for the cam follower. This socket member may be adjusted lengthwise of rod 32 by releasing a connecting screw 35 in order to make the adjustment and then again tightening it to hold the parts in their adjusted position. Rod 32 is supported by a guide 36 which is adjustable lengthwise of a slotted member 37 extending lengthwise of nozzle 20. This nozzle is biased against a stop 38 by a tension spring 39, one end of which is attached to the nozzle and the other end of which is attached to slotted member 37. This spring also acts to bias the cam follower 31 against the surface of conical cam 30 when rod 32 and socket member 34 are properly adjusted.

It is thus apparent that by adjusting rod 32 lengthwise of cam 30 and nozzle 20, means are provided for controlling the amplitude of oscillation imparted to the nozzle. The lengthwise adjustment of socket 34 on rod 32 provides for the necessary lengthening or shortening of the connection between cam 30 and nozzle 20.

Cam 30 is supported on a shaft 40 and is adjustable lengthwise thereof. It may be held in any desired adjusted position on this shaft by means of screws 41. Consequently the amplitude of oscillating of nozzle 20 may also be adjusted by moving cam 30 relatively to nozzle 20 and slotted member 37.

The upper end of shaft 40 is supported in a bearing 42 and its lower end extends through a bearing in and is connected to the mechanism of a variable speed transmission 43. This variable speed transmission is connected with the variable speed transmission 13 above referred to, through gearing or a similar connection 44. Variable speed transmission 43 is also provided with a hand wheel 45 for adjusting the rotational speed of shaft 40 and consequently the rotational speed of cam 30.

It will thus be seen that a machine having the construction above illustrated, provides means for traversing the work relative to the welding head at adjustable speeds which in accordance with my invention are greater than a desired welding speed and that means are also provided for oscillating the electrode forward and backward along the line of welding with any desired frequency or amplitude of oscillation.

The relative travel between the arcing terminal of the electrode and the work is determined by the configuration of cam 30. Typical configurations have been illustrated in Figs. 2 and 3 of the drawing.

In Fig. 3 a constant speed of rotation of cam 30 through 240° advances the arcing terminal of the electrode in the direction of work travel at a uniform speed one half of that at which the work is traveling. Thus, while the work is traveling forward four units, the arcing terminal of the electrode travels forward two units resulting in a weld two units in length at a welding speed equal to the difference of the speeds of the work and the arcing terminal of the electrode. During the next 120° of rotation of the cam, the arcing terminal of the electrode is returned to its initial position through two units of distance while the work is traveling forward through two units of distance. The result obtained is a weld two units long separated from the last weld by a space of four units.

In Fig. 2 the shape of the cam for the same rotational speed gives a series of welds of the same length and spacing. The configuration of the cam, however, is such that during the first and last units of work travel while welding, the arcing terminal of the electrode is stationary relative to the work for a substantial period of time. Furthermore, the full 360° of the cam are employed for controlling relative travel during welding of the arcing terminal of the electrode and the work so that after performing a welding operation, the arcing terminal of the electrode is for all intents and purposes instantaneously returned to its starting position for the next weld.

It is apparent that many cam configurations may be employed to obtain desired methods of welding and desired lengths of welds spaced from one another by predetermined amounts.

The configuration of cam 30 at any section and its speed of rotation determine the relative travel of the arcing terminal of the electrode and the work for a given velocity of travel of the work. It is thus apparent that by making proper adjustments, welding speeds of any desired value may be obtained. Furthermore, by using cams of the proper shape and by adjusting the amplitude and frequency of oscillation of the nozzle, many adjustments are provided for determining not only the welding speed but also the length of each weld and the space between them. Furthermore, it is apparent that the cross sectional configuration of the conical cam from end to end need not be symmetrical since different configurations may be required in conjunction with the other adjustments provided in order to obtain a desired welding speed for welds of desired length and spacing. Instead of using the tapered cam illustrated, a stepped cam may be employed in which case the longitudinal sections of the cam would have configurations which with the other adjustments provided would satisfy the particular requirements with regard to speed of welding and the length and spacing of the welds.

Since the use of certain cam shapes may result in occasional extinguishment of the arc when it is transferred from the end of one weld to the beginning of the next, the dwell period at the start of the weld, such as obtained by the cam of Figs. 1 and 2 may assume importance. This dwell period will furnish a high speed welding control such as above referred to with the necessary interval of time required for again striking an arc. If the arc is not extinguished during such transfer, the dwell periods at the beginning and end of each weld may nevertheless be highly desirable in order to obtain satisfactory penetration at the beginning of a weld and prepare the arc for its rapid transfer to the next weld.

Dwell periods may also be employed to make spaced spot welds. A suitable relative travel of the welding agency before and after each dwell period will also secure when making such spaced welds a desired weld taper, eliminate craters and burnt areas and generally result in an improvement of the weld structure.

The particular oscillations above employed for obtaining intermittent tack welds does not preclude the use of certain superimposed oscillations for simulating the weaving actions of a welding operator. Thus, means may be provided for oscillating the welding agency across or at right angles to the seam or line of welding or for rotating it about a center offset from its geometric center. Other desired motions may, by the use of suitable mechanical movements, also be imparted to the welding agency without departing from my invention.

It is not necessary to employ all the features above described in connection with my invention. For example, the welding circuit may be opened and closed at the beginning and end of each welding operation through the agency of limit switches on one or more of the moving elements of the welding machine. With this modification the machine would still avoid in part the limitations of machines which depend on clutch devices for alternately traversing the work at a welding speed and at a speed greater than the welding speed.

Various modifications and variations of my invention will occur to those skilled in the art in view of the above disclosure of one embodiment thereof. I therefore intend to cover by the appended claims all such modifications and variations of my invention as fall within the true spirit and scope thereof.

What I claim as new and desire to secure by Letters Patent of the United States is:

1. Apparatus comprising a welding agency, a support for said welding agency, means for traversing said support and the work relatively to one another along the line of welding at speeds greater than the desired speed of welding, and means for alternately moving said welding agency forward and backward relatively to its said support along the line of welding at speeds which in one direction reduces the relative speed of said welding agency and the work to the desired speed of welding to form welds of predetermined length and which in the other direction increases the relative speed of said welding agency and the work to space said welds from one another.

2. Apparatus comprising a welding agency, a support for said welding agency, means for traversing said support and the work to be welded relatively to one another along the line of welding at a substantially constant speed greater than the desired welding speed, and means for alternately moving said welding agency relatively to its said support in one direction along the line of welding at a substantially constant speed which when subtracted from the speed of said traversing means produces the desired welding speed between said welding agency and the work, and in the opposite direction along the line of welding at a speed which when added to the speed of said traversing means effectively inhibits welding of the work by said welding agency.

3. Apparatus comprising a welding agency, a support for said welding agency, means for traversing said support and the work relatively to one another along the line of welding at a substantially uniform speed greater than the desired speed of welding, and means for oscillating said welding agency relatively to its said support along the line of welding to produce periods of welding when the welding agency and work travel relatively to one another at the desired speed of welding and alternate periods during which no welding is effected by reason of the high speed of relative travel of said welding agency and the work.

4. Apparatus comprising a welding agency, a support for said welding agency, means for traversing said support and the work relatively to one another along the line of welding at a speed greater than the desired speed of welding, means for oscillating said welding agency relatively to its said support along the line of welding at speeds which in one direction reduces the relative speed of said welding agency and the work to the desired speed of welding to form welds of predetermined length, and in the other direction increases the relative speed of said welding agency and the work to space said welds from one another, means for adjusting said oscillating means to determine the welding speed, the length of said welds and their spacing, and means for adjusting the speed of said traversing means.

5. Welding apparatus comprising means for traversing an electrode and the work relatively to one another along the line of welding at a substantially constant speed greater than the desired speed of welding, and means for oscillating the arcing terminal of said electrode relatively to said traversing means at a speed in one direction along the line of welding which is productive of welding at said desired speed, and at a speed in the opposite direction which rapidly transfers the arcing terminal of said electrode from the end of one weld to the beginning of the next weld across the space between them.

6. Welding apparatus comprising means for establishing and maintaining a welding arc of predetermined length between the arcing terminal of an electrode and the work to be welded, means for traversing said electrode and work relatively to one another along the line of welding at a substantially constant speed greater than the desired speed of welding, and means for alternately moving said electrode forward and backward relatively to said traversing means along the line of welding to produce between its arcing terminal and the work a dwell period for initiating a weld followed by a travel period at the desired speed of welding for making welds of predetermined length and a transfer period at a greater speed than the speed of said traversing means for spacing said welds relatively to one another.

7. Welding apparatus comprising means for establishing and maintaining a welding arc of predetermined length between the arcing terminal of an electrode and the work to be welded, means for traversing said electrode and the work relatively to one another along the line of welding at a substantially constant speed greater than the desired speed of welding, and means for moving said electrode relatively to said traversing means forward and backward along the line of welding at speeds which establish repeated cycles of operations during each of which for predetermined periods of time the arcing terminal of said electrode is substantially stationary relative to the work, travels over the work at said desired welding speed and travels over the work at a speed greater than that of said traversing means to form a series of welds of predetermined length and spacing.

8. Apparatus for producing welds of predetermined length and spacing comprising an electrode guide for positioning the arcing terminal of an electrode over the line of welding, means for supporting said guide for oscillating movement along the line of welding, means for traversing said support and the work relatively to one another at a substantially constant speed greater than the desired speed of welding, means for adjusting the speed of said traversing means, means for oscillating said electrode guide to produce between the arcing terminal of said electrode and the work travel periods of the desired speed of welding which alternate with transfer periods of a speed greater than the speed of said traversing means, and means for adjusting said oscillating means to vary either or both the frequency and amplitude of oscillation imparted to said electrode guide.

9. Apparatus for producing welds of predetermined length and spacing comprising an electrode guide for positioning the arcing terminal of an electrode over the line of welding, means for supporting said guide for oscillating movement along the line of welding, means for traversing said support and the work relatively to one another at a substantially constant speed greater than the desired speed of welding, means for adjusting the speed of said traversing means, means for oscillating said electrode guide periodically to produce between the arcing terminal of said electrode and the work a dwell period, a travel period at the desired speed of welding and a transfer period at a speed greater than the speed of said traversing means, and means for adjusting said oscillating means to vary either or both the frequency and amplitude of oscillation imparted to said electrode guide.

10. Welding apparatus for making a series of welds of predetermined length and spacing comprising means for rapidly establishing and maintaining a welding arc of predetermined length between the arcing terminal of an electrode and the work to be welded, means for traversing said electrode and the work relatively to one another along the line of welding at speeds greater than the desired speed of welding, and means for oscillating said electrode relatively to said traversing means along the line of welding at speeds productive of the following resultant conditions between the arcing terminal of said electrode and the work: a dwell period, a welding period with relative travel at the desired speed of welding, a second dwell period, and a transfer period with relative travel at a speed greater than the speed of said traversing means.

11. Apparatus comprising a welding agency, a support for said welding agency, means for traversing said support and the work relatively to one another along a line of welding in the work, and means for alternately moving said welding agency relative to its said support forward and backward along said line of welding in one direction at a speed which arrests the relative travel between said welding agency and the work for a time sufficient for said welding agency to form a weld in the work and in the other direction at a speed which increases the relative speed of travel between said welding agency and the work sufficiently to inhibit welding of the work and space said welds from one another.

12. Apparatus comprising a welding agency, a support for said welding agency, means for traversing said support and the work relatively to one another along a line of welding in the work, and means for moving said welding agency relatively to its said support forward and backward along said line of welding at speeds which alternately produce for predetermined periods of time welding speeds of relative travel between said welding agency and the work to form welds of desired lengths and speeds of relative travel between said welding agency and the work which are great enough to inhibit welding and space said welds predetermined distances from one another.

JASPER E. ANDERSON.